United States Patent
Ries

[11] 3,910,108
[45] Oct. 7, 1975

[54] TENSIONING DEVICE

[76] Inventor: Russell J. Ries, 1611 Garden Club Drive, Fort Wayne, Ind. 46825

[22] Filed: June 27, 1973

[21] Appl. No.: 374,052

Related U.S. Application Data

[63] Continuation-in-part of Ser. No. 244,462, April 17, 1972, abandoned.

[52] U.S. Cl. .................................. 73/143; 73/134
[51] Int. Cl.² ........................................ G01L 3/20
[58] Field of Search ....... 73/134, 168, 143; 188/292

[56] References Cited
UNITED STATES PATENTS

| | | | |
|---|---|---|---|
| 1,642,095 | 9/1927 | Tracy | 73/134 |
| 2,120,386 | 6/1938 | Baash et al. | 188/292 X |
| 2,603,968 | 7/1952 | Cline | 73/134 |
| 2,781,178 | 2/1957 | Bowen, Jr. | 188/292 X |
| 2,981,099 | 4/1961 | Lapp | 73/134 |
| 3,742,758 | 7/1973 | Pohl | 73/134 |

FOREIGN PATENTS OR APPLICATIONS

| | | | |
|---|---|---|---|
| 145,371 | 4/1936 | Austria | 73/134 |
| 458,020 | 3/1928 | Germany | 73/134 |

*Primary Examiner*—Charles A. Ruehl

[57] ABSTRACT

An improved hydraulic device for use in loading motors consisting of a hydraulic gear pump with a metering valve contained in the passageway connecting the output of the pump to the input thereof. By measuring the fluid pressure within the hydraulic device or, alternatively, by mounting the motor on a rotatable plate which is balanced relatively to the motor, and providing calibrated indicator means, the torque output of the motor in inch-pounds or whatever other value is desired at a given R.P.M. of the motor may be indicated. Gear rotation can occur in either of opposite directions to change the direction of fluid flow.

1 Claim, 9 Drawing Figures

3,910,108

TENSIONING DEVICE

RELATED APPLICATION

This is a continuation-in-part of Ser. No. 244,462 filed Apr. 17, 1972, titled "HYDRAULIC BRAKE" and now abandoned.

BACKGROUND OF THE INVENTION

There is a substantial need for a device which is capable of measuring the torque output of motors and other devices at various speeds. With the present invention it is possible to completely test the output of small motors by relating the output of the motor through a hydraulic device to a readout device which indicates torque output.

The same hydraulic device is useable where it is desired to maintain a known tension on the cable, wire, rope or other material wound onto a wind-up device.

OBJECTS OF THE INVENTION

It is a principal object of the present invention to provide a continuous or intermittent means for measurement of the torque output of motors and the like.

A further and related object of the present invention is to provide a calibrated means for measuring the torque output of a motor with such torque value being continuously measured regardless of the speed of the motor and size of the motor.

A still further object of the invention is the utilization of the hydraulic device in coupled relation with a wind-up mechanism whereby the motor will effect a known wind-up tension on a cable, wire, or rope etc. while being wound onto the wind-up device.

Other objects and features of the present invention will become apparent from a consideration of the following description which proceeds with reference to the accompanying drawings wherein selected example embodiments of the invention are illustrated by way of example and not of limitation.

DETAILED DESCRIPTION OF THE INVENTION

Figure 1:
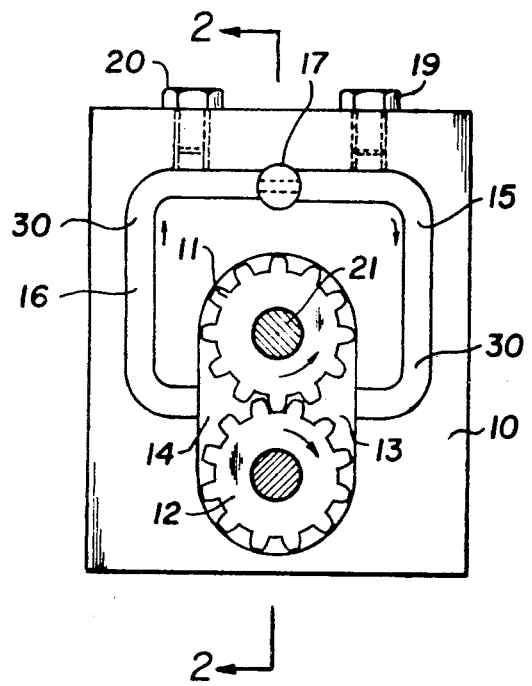
FIG. 1 is a cross-sectional view taken on line 1—1 of FIG. 2.
Figure 2:
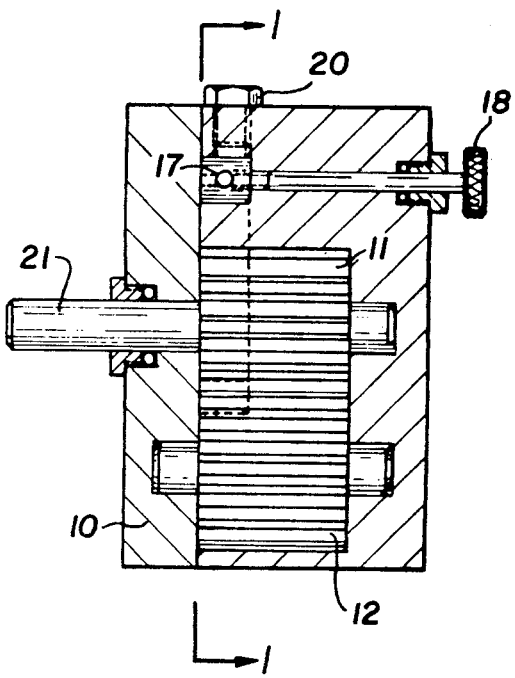
FIG. 2 is a cross-sectional view taken on line 2—2 of FIG. 1.
Figure 3:
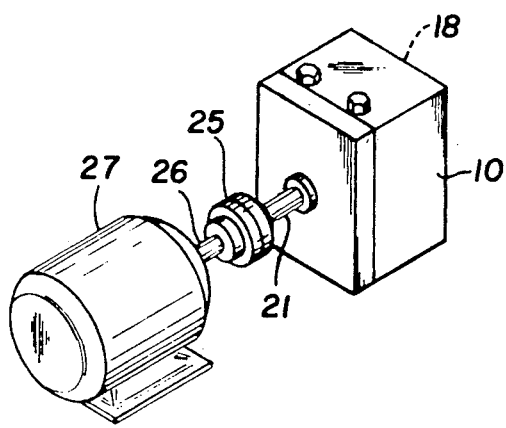
FIG. 3 is a perspective view of the brake illustrating an electric motor under test wherein the torque output thereof is measured in accordance with the present invention.

Turning now descriptively to the drawings, in which similar reference characters denote similar elements throughout the several views, FIG. 1 is a cross-section of the hydraulic brake 10. Rotating gears 11 and 12 trap the hydraulic oil 30 in the input cavity 13 and force it into the output cavity 14 where the oil flows through channel 16 into metering valve 17 to input channel 15 and back to input cavity 13. As metering valve 17 is increasingly restricted, greater power is required to rotate the pump against the back pressure created by the metering valve 17. Opening up the metering valve permits the oil 30 to flow through the circuit with a minimum of back pressure and permits the driving unit 27 as shown in FIG. 3 of the hydraulic brake 10 to operate under minimum loading conditions.

While many different hydraulic oils may be utilized in this device, a preferred choice is heavy oil such as S.A.E. grade 140 for low R.P.M.

Oil 30 is added at intake 1o which is sealed with a fastener and both intake 19 and outflow 20 may be opened slightly under initial use to bleed any entrapped air which would interfere with the proper operation of the brake unit.

By measuring the pressure of hydraulic fluid or oil 30 is it possible to secure a measurement of the amount of developed torque of motor 27.

Figure 4:
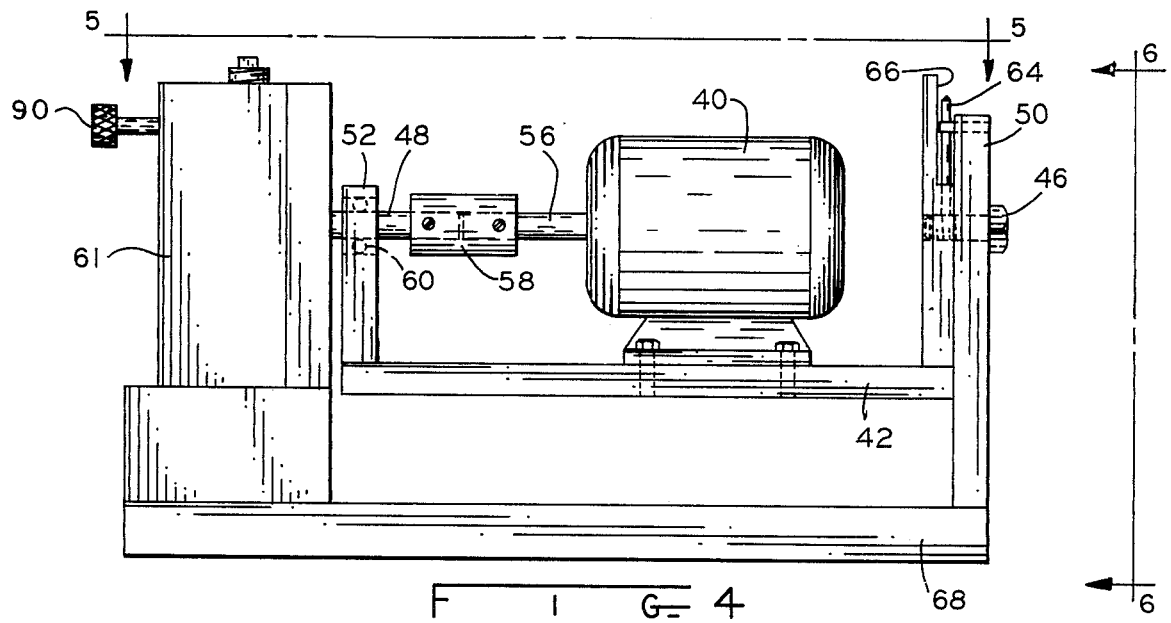
FIG. 4 is a front elevation view of a further embodiment of the invention.
Figure 5:
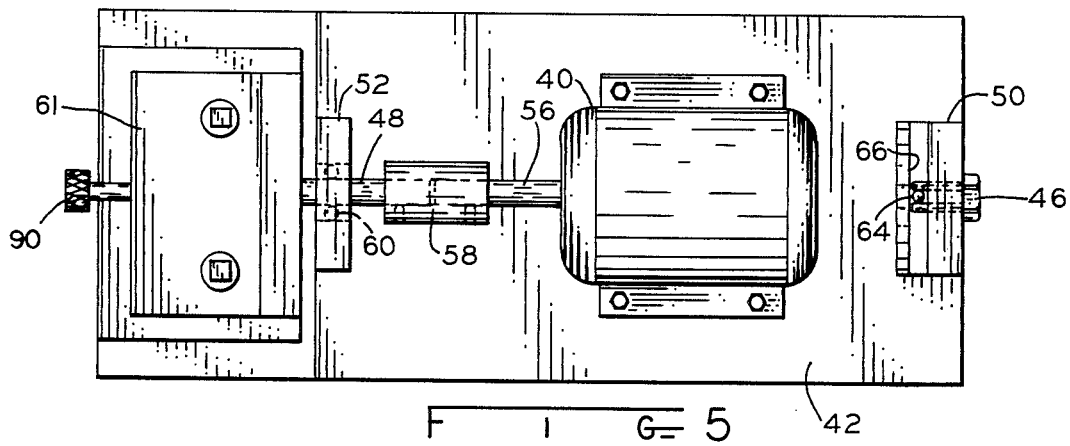
FIG. 5 is a top view, looking in the direction of the arrows 5—5 in FIG. 4.
Figure 6:
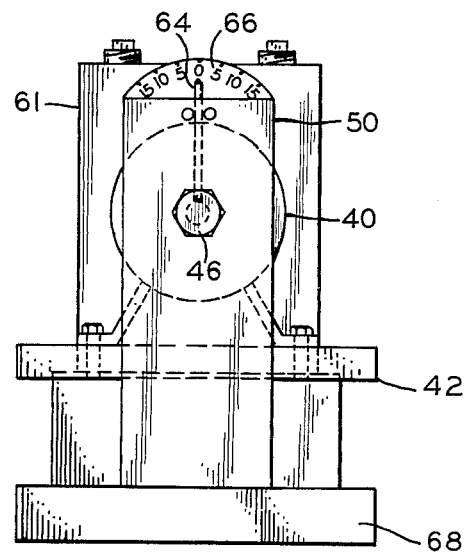
FIG. 6 is an end view looking in the direction of 6—6 in FIG. 4.

In another embodiment of the invention shown in FIGS. 4, 5 and 6, motor 40 is mounted on a plate 42, the plate 42 being rotatable supported on a pin 46 and a rod 48 which are mounted within arms 50 and 52.

Motor 40 has an output shaft 56 and a coupling 58 connecting it with rod 48 which in turn is supported on ball bearings 60. Rod 48 extends within enclosure 61 which includes a closed circuit hydraulic fluid housing and circulation system the same as previously described in connection with the structure of FIG. 1.

By regulating the restriction in the circuit through control knob 90 operatively connected to metering valve 17, it is possible to determine the amount of output developed by the motor 40 at a given R.P.M. since the restriction is calibrated. Thus the rotating effect on plate 42, will produce an angular displacent such that indicator needle 64 will readout directly in inch-pounds or foot-pounds of torque on dial 66 in FIG. 6.

The entire assembly is supported on a base 68 and it is possible in this manner, by coupling and decoupling motor 40 that with the aid of removable bolts, (not shown) to check the amount of torque output of any given motor by simply calibrating the metering valve 17 and readout on the dial 66.

The invention is thus applicable to any of several different motors which are readily calibrated for testing.

Figure 7:
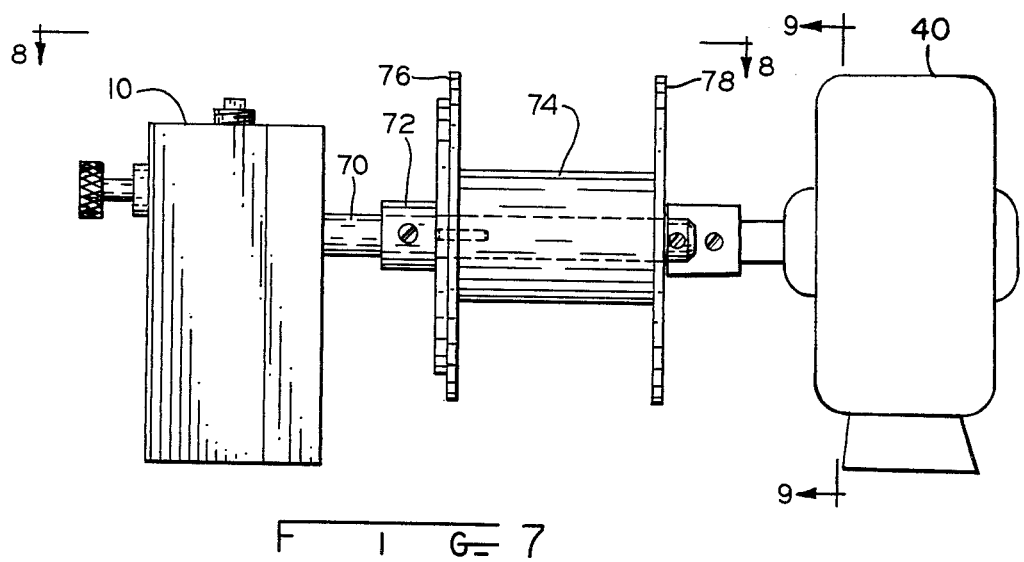
FIG. 7 is a front elevation view of the hydraulic device as applied to a wind-up spool the purpose being to maintain a known torque on the spool; and, FIGS. 8 and 9 are top and end views taken respectively in the direction of the arrows 8—8 and 9—9 of FIG. 7.
Figure 8:
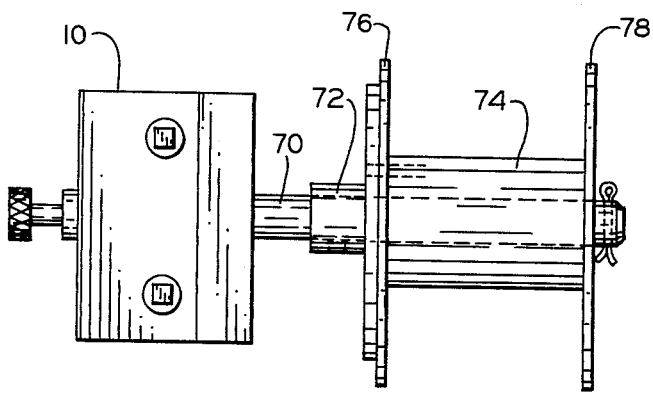
Figure 9:
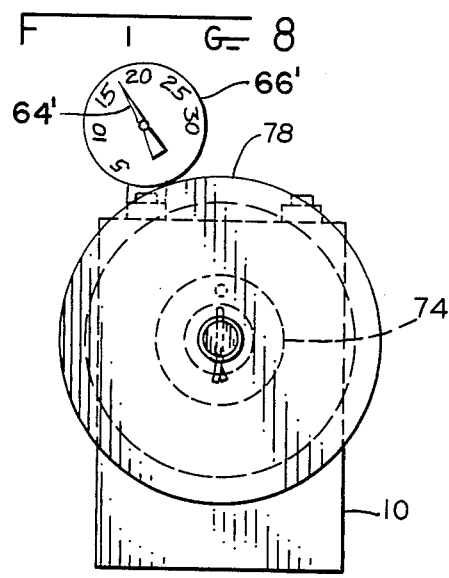

Referring next to the embodiment shown in FIGS. 7, 8 and 9, the hydraulic device 10 is secured to a shaft 70 and through coupling member 72 to a reel 74 with sides 76, 78. The reel or drum 74 is mounted on a shaft and the purpose of the hydraulic device 10 is to maintain a known tension during winding on the drum 74 of a quantity of wire, rope, cable, etc. thereon. The fluid pressure within the hydraulic device 10 is indicated by needle 64' on dial 66'. The hydraulic device 10 functions generally as a hydraulic brake and controls the load on motor 40. Consequently, the torque applied to wind-up spool 74 is regulated in a manner to control the tension of the material wound thereon.

Although the present invention has been illustrated and described in connection with certain selected example embodiments of the invention, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

I claim:

1. An improved hydraulic device for use in combination with a prime mover comprising a pair of gear wheels constructed and proportioned to fit in close fitting relationship therebetween, enclosure means forming a chamber having input and output portions for receiving said gears and providing bearing surfaces one on each side of each gear whereby fluid from each such gear is transferred through said enclosure, passage means formed in said enclosure and interconnecting said input and output portions of said chamber, adjustable valve metering means disposed within said passage means to controllably restrict the flow of fluid and thereby effect a regulatable load acting as a resistance force to the rotation of said gears, calibrated measuring means responsive to fluid pressure within said chamber, a spool operatively secured to said hydraulic device and adapted to receive wire, rope, cable and the like, and means forming a coupling between said spool, said prime mover and said hydraulic device.

* * * * *

UNITED STATES PATENT AND TRADEMARK OFFICE
CERTIFICATE OF CORRECTION

PATENT NO. : 3,910,108
DATED : October 7, 1975
INVENTOR(S) : Russell J. Ries

It is certified that error appears in the above–identified patent and that said Letters Patent are hereby corrected as shown below:

Line 16, Column 2: "lo" should read --19--.

Signed and Sealed this thirteenth Day of January 1976

[SEAL]

Attest:

RUTH C. MASON
*Attesting Officer*

C. MARSHALL DANN
*Commissioner of Patents and Trademarks*